United States Patent [19]

Cheatham

[11] Patent Number: 5,174,196
[45] Date of Patent: Dec. 29, 1992

[54] KA-BOB PREPARATION DEVICE

[76] Inventor: Paul G. Cheatham, P.O. Box 3443, Quartz Hill, Calif. 93586

[21] Appl. No.: 792,642

[22] Filed: Nov. 15, 1991

[51] Int. Cl.$^5$ ............................................. A47J 37/04
[52] U.S. Cl. .................................. 99/419; 99/421 A; 99/448
[58] Field of Search ...................... 99/419, 420, 421 R, 99/421 A, 421 M, 421 TP, 442, 532, 448; 211/125; 206/45.19, 382, 486, 562, 564

[56] References Cited

U.S. PATENT DOCUMENTS

| | | | |
|---|---|---|---|
| 281,683 | 7/1883 | Gibson | 99/421 V |
| 2,052,505 | 8/1936 | Vetrosky | 99/419 |
| 2,362,921 | 11/1944 | Palensky | 99/419 |
| 3,466,999 | 9/1969 | Yanez-Pastor et al. | 99/413 |
| 4,076,116 | 2/1978 | Sowders | 206/45.19 |
| 4,366,750 | 1/1983 | Brown et al. | 99/421 V |
| 4,429,435 | 2/1984 | Walls | 99/419 |
| 4,589,333 | 5/1986 | Murphy | 99/446 |
| 4,612,851 | 9/1986 | McManus | 99/421 A |
| 4,745,968 | 5/1988 | Demos | 99/421 A |
| 4,887,523 | 12/1989 | Murphy et al. | 206/562 |

FOREIGN PATENT DOCUMENTS

| | | | |
|---|---|---|---|
| 2550435 | 2/1985 | France | 99/419 |
| 2215188 | 9/1989 | United Kingdom | 99/419 |

Primary Examiner—Timothy F. Simone
Attorney, Agent, or Firm—James G. O'Neill

[57] ABSTRACT

A device for making a plurality of Ka-bobs includes a weighted holding base with a plurality of holes passing entirely therethrough. Each hole in the base has a countersink around it in the upper surface of the device, for the quick and easy insertion of a skewer into each hole. The device enables a single worker to utilize the method of the invention to prepare a plurality of ka-bobs, at the same time, by impaling food items, one item at a time, onto skewers held in the base. Additionally, the device is assembled from a minimum of parts so as to include a pair of handles and a minimum of connecting points and joining areas, to allow for easy cleaning and the prevention of the growth of bacteria and germs on the device.

4 Claims, 2 Drawing Sheets

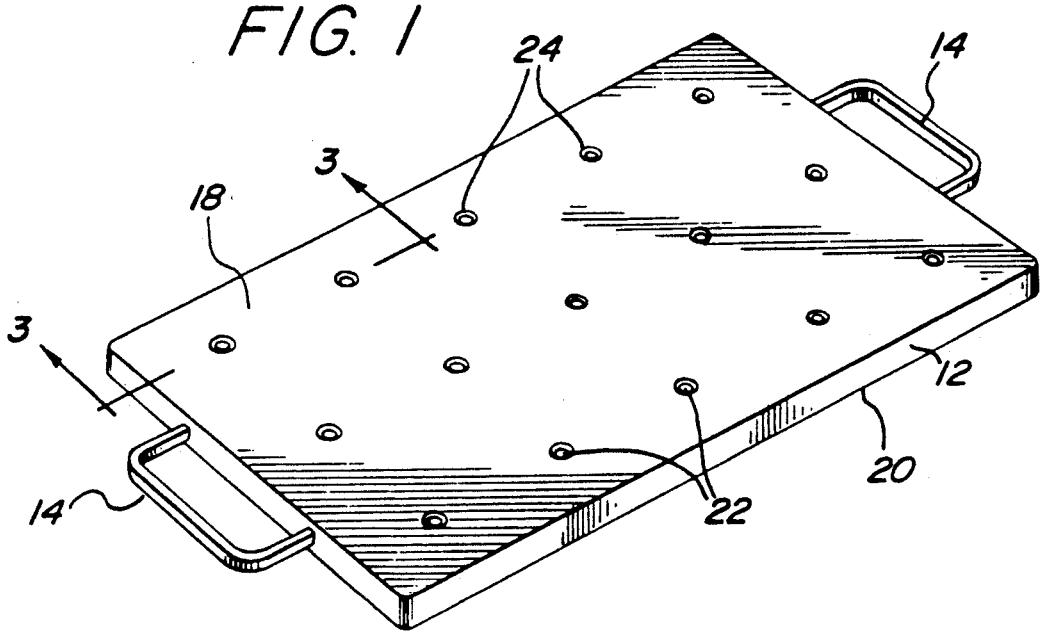
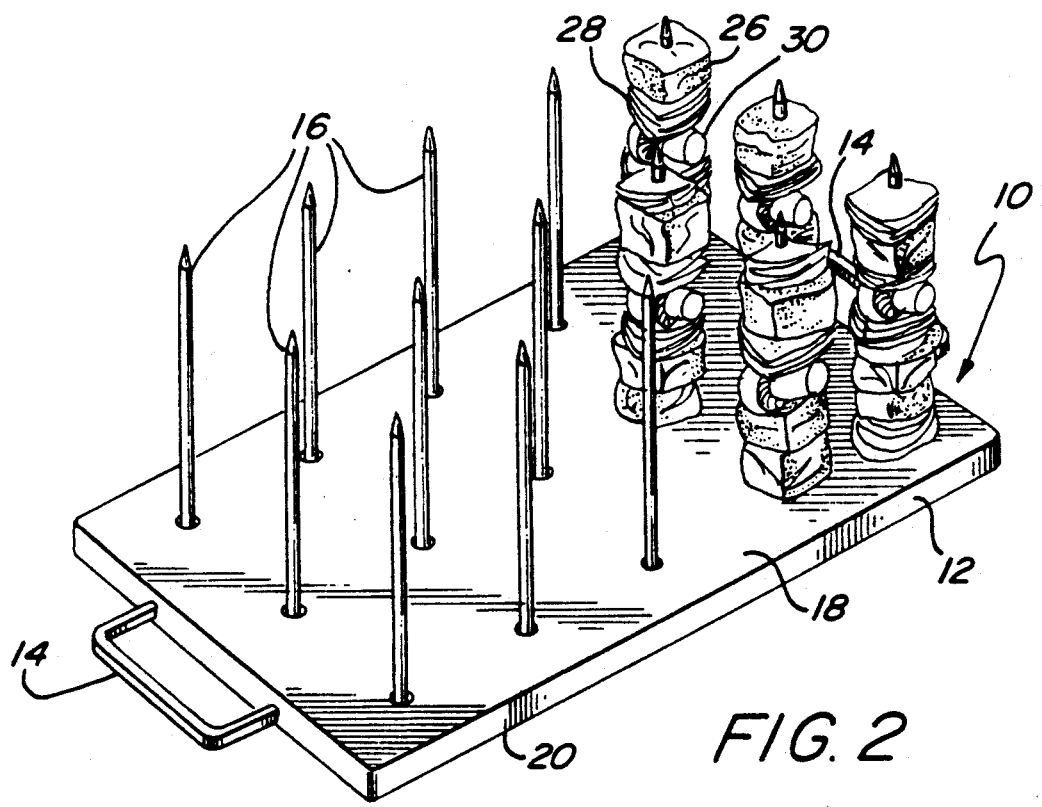

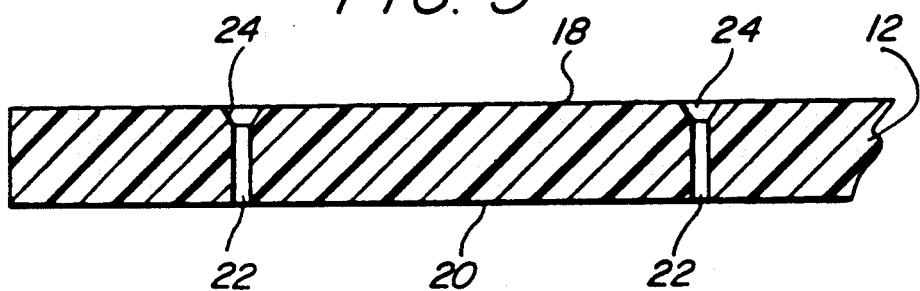
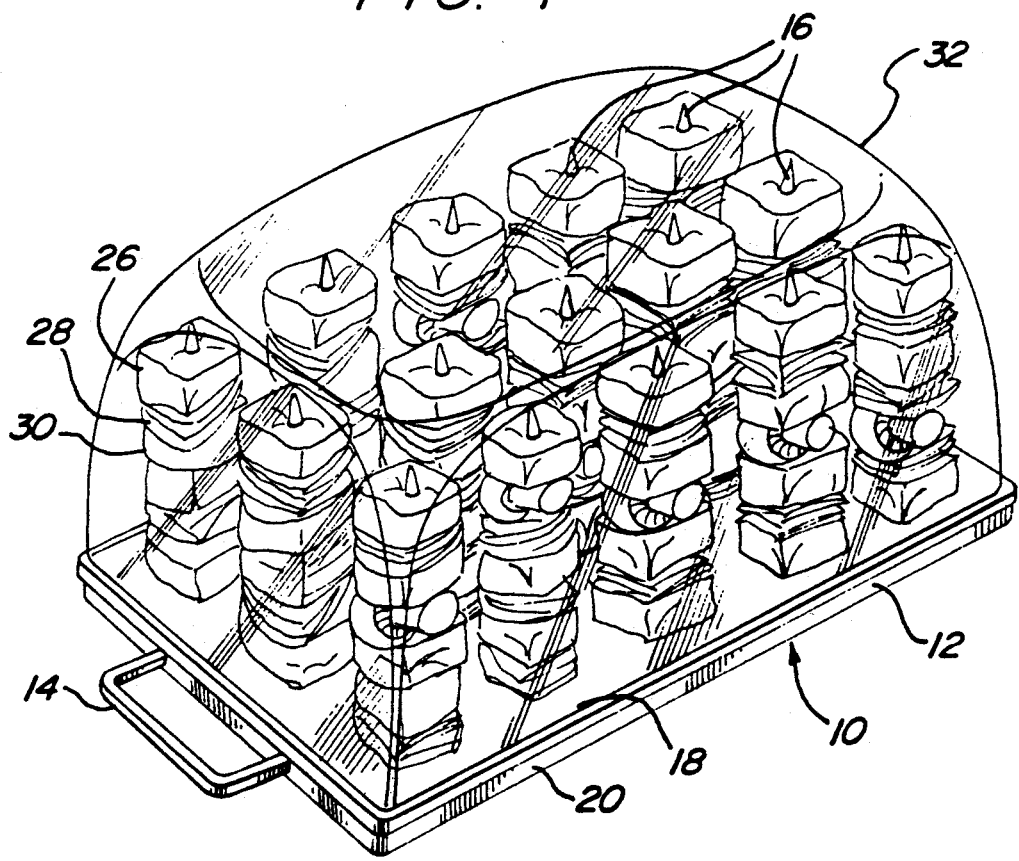

KA-BOB PREPARATION DEVICE

BACKGROUND OF THE INVENTION

1. Field of the Invention

This invention relates generally to food preparation and handling and more particularly to a ka-bob preparation method and device.

2. Description of Related Art

Display and cooking means for shish kabob ("ka-bob") and other foods are known. These known means normally are used to show prepared foods, such as ka-bobs in refrigerated display cases, or to mount food, such as prepared ka-bobs, in a desired position for baking or cooking the mounted foods. However, after many attempts to solve the problems of preparing and holding a plurality of ka-bobs for use in a restaurant or similar type of establishment, there still exists the need for a simple, easy to use, low-cost device that allows a plurality of ka-bobs to be prepared at the same time, in a minimum of space, by one person, and which device also meets the stringent requirements mandated by health and safety codes for food handling and preparation devices for use in restaurants or other establishments where the need exists to prepare and hold a large number of prepared ka-bobs.

One such prior art device is shown in U.S. Pat. No. 4,076,116 which discloses a ka-bob display device having a rectangular form holder with a plurality of angled apertures formed therein, opening to the top of the holder. The holder is mounted and locked in a tray having upturned edge portions for mounting in a refrigerated display case. This patent, however, fails to disclose how the ka-bobs to be displayed therein are prepared. Furthermore, because of the construction of the holder and the tray in which it is held, this display device would not meet the health code standards of most, if not all, communities for preparation of and holding of prepared ka-bobs in the food industry.

U.S. Pat. No. 4,887,523 shows a shish-kabob cooking device having a base unit with at least one vertical hole that ends in the base unit to receive one end of a prepared ka-bob, and a trough or depression and a drain connecting the end of the hole in the base unit to the trough so that grease, juices or other liquids generated in baking the ka-bob will flow downwardly and be collected in the trough. This patent also fails to disclose how the ka-bobs to be displayed in the cooking are prepared, and because of its construction would also fail to meet the health code standards of communities for preparation and holding devices for use in the food industry.

Other holding racks or trays for various elements are shown by U.S. Pat. Nos. 3,390,784, 3,532,221, 3,643,812, 3,712,465 and 3,768,639. However, the construction of the devices shown in all of these patents would fail to support a plurality of ka-bobs for use in a restaurant or similar setting, and would also fail to meet the stringent health codes for food preparation and storage devices for use in the food industry.

While the foregoing prior art devices have provided some limited improvements and overcome some of the problems encountered in the cooking and storage of ka-bobs in certain circumstances, there remains the need in the food industry for a ka-bob preparation method which enables a plurality of ka-bobs to be prepared at the same time by a single worker, and a device to accomplish the same which also meets the stringent health codes of the food industry.

SUMMARY OF THE INVENTION

Accordingly, it is a general object of the present invention to provide a method for preparing a plurality of ka-bobs. It is a particular object of the present invention to provide a reusable device for the preparation of a plurality of ka-bobs. It is a still more particular object of the present invention to provide a reusable ka-bob preparation device which meets the stringent health codes for food preparation devices in the food industry. It is a further particular object of the present invention to provide a simple method and device for use therewith for the quick and easy preparation of a plurality of ka-bobs, at the same time, by a single person. And, it is yet a still further particular object of the present invention to provide a method and device for the preparation and holding of a plurality of ka-bobs, which device meets that health requirements of the food handling industry everywhere.

In accordance with one aspect of the invention there is provided a weighted holding base having a plurality of holes passing entirely therethrough, with each hole including a countersink in the upper surface of the device, for the quick and easy insertion of a skewer into each hole. The device enables a single worker to prepare a plurality of ka-bobs at the same time using the method of the present invention. Additionally, the device is assembled from a minimum of parts so as to include a pair of handles and a minimum of connecting points and joining areas, to allow for easy cleaning and the prevention of the growth of bacteria and germs on the device.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is a perspective view, looking from the top, of a ka-bob preparation and holding device in accordance with the present invention;

FIG. 2 is a further perspective view of the device of FIG. 1 with a plurality of skewers inserted in holes formed therein, with some of the skewers having food items impaled thereon in accordance with the method of the present invention;

FIG. 3 is a partial cross sectional view, taken along line 3—3 of FIG. 1, looking in the direction of the arrows; and FIG. 4 is a still further perspective view, similar to FIG. 2, showing all the skewers with food items thereon, and a clear cover over the ka-bobs.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved ka-bob preparation method and a holding device or tray for use with the method, shown generally at 10. The device 10 includes a base 12, which is preferably substantially rectangular in shape, and a pair of handles 14, formed integrally with, or fixed to the base 12, in any convenient manner known to those skilled in the art, with no clearance between any mating surfaces of the base and the handles to thereby prevent any liquids and/or solid matter to enter between the same, so as to easily clean and keep the connecting points bacteria and germ free. It is to be understood that the handles 14 may be formed or fixed to the base at any convenient angle, and that the base and the handles are made from a butcher block, metal, plastic, or other type material that have sufficient weight and may be safely used around meats and other food items. That is, the device 10 is made from material which is substantially resistant to the formation of bacteria and/or germs thereon. Furthermore, this material must be easily sterilized by washing the device 10 in hot water and soap, of the type usually found in a commercial establishment that sells or serves food, such as a restaurant, or the like. Additionally, the material from which the base 12 is made must be of adequate thickness and have sufficient weight so that the base will support, and not be moved or tipped over by a plurality of loaded ka-bobs, on skewers 16, held in holes in the base.

The base 12 includes a substantially flat bottom surface 20 and a substantially flat top surface 18, with four substantially flat side edges connecting the bottom and top surfaces. As stated above, the base is made from a material having sufficient thickness and weight to meet the criteria of a food handling establishment requiring a plurality of ka-bobs for sale or serving purposes. A plurality of holes 22 are formed, in any convenient manner, in the base 12 and pass entirely through the base from the top surface 18 to the bottom surface 20 to allow any liquid or solid material which may enter the holes to drain away or be easily removed, and not become trapped therein. For illustrative purposes only, 15 holes are shown in FIG. 1. Each of the holes 22 preferably includes a countersink 24 formed around the same on the top surface 18, and each hole and its corresponding countersink is of such a size that metal or wooden skewers 16, of any conventional shape, may have their blunt ends, easily and quickly inserted therein. With the blunt ends of the skewers 16 inserted and held in the holes 22, the sharpened ends of each skewer will point outward, away from top surface 18 of base 12, as is shown in FIGS. 2 and 4.

As is readily known, ka-bobs are usually made or prepared, one at a time, by impaling chunks of meat, mushrooms, vegetables and other foods, as desired, onto the sharpened end of a skewer, and pushing the food items, so impaled, toward the other or blunt end of the skewer, until a sufficient amount of food is felt to be impaled on and carried by the skewer. In using the method of the present invention to prepare ka-bobs, the base 12 of the device 10 is placed on a flat surface, such as a food preparation counter or table and a plurality of empty skewers 16 are inserted and held in each of the holes 22, as explained above. Each skewer 16 may then have desired items of food 28, 30, 32, etc. impaled thereon by a worker or user, one item at a time, until each skewer is loaded to the desired height, such as shown in FIGS. 2 and 4. Although only three skewers are shown as being fully loaded in FIG. 2, it is to be understood that this is done for illustrative purposes only to more clearly show how the empty skewers 16 fit into the holes 22 and countersinks 24.

When a person is using the method and device of the present invention in their preferred and best modes, each skewer 16 has one food item at a time impaled on it sharpened end and pushed down toward its other end captured in the base, then each skewer will have a second food item impaled on it and pushed down. Further food items are then impaled on and pushed down on each skewer, until all of the skewers held in the base are fully loaded, to form ka-bobs of the desired size. Depending on the need of the restaurant or establishment in which the skewers have been made, the skewers may then be left in the base, or removed from the base for cooking or sale, or the skewers may be left in the base, and the base and skewers transported to a place of use by the handles 14. After the base is emptied of the loaded skewers, the base should be cleaned and/or sterilized before being used again, to prevent any unhealthy conditions from arising.

In a further embodiment of the tray of the present invention, as shown in FIG. 4, a clear cover 32 may be mounted over and supported on the top surface 18 of the tray. This clear cover may be of any desired shape and be made from any desired material such as plastic or glass, so long as it is easy to lift off and put on the tray, to cover a plurality of loaded ka-bobs supported in the tray. The cover will help keep the ka-bobs fresher and guarded from foreign objects, as well as the breath of a food handler when transporting the tray and loaded ka-bobs to a place of storage or use.

Although the device of the present invention could be used to hold and store prepared ka-bobs for extended periods of time in a refrigerated or unrefrigerated environment, it is the intent of the present invention to use the method to prepare a plurality of ka-bobs with fresh ingredients, at the same time, on the device 10, and then have these prepared ka-bobs used a short period of time thereafter, while the food ingredients impaled on the loaded ka-bobs are still fresh.

It, therefore, can be seen that the present invention provides a novel ka-bob preparation method and device, which are simple to use and which allow a plurality of ka-bobs to be made, at the same time. In addition, since the device has no openings or areas where debris or liquids may collect, the device may be easily cleaned and is not susceptible to the formation of bacteria or germs thereon, to thereby meet the stringent health codes for use in food serving and selling establishments.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A food preparation and holding device for preparing and holding a plurality of ka-bobs, comprising, in combination:

a substantially rectangular base having a substantially flat top surface, a substantially flat bottom surface and a plurality of substantially flat side edges connecting said top and bottom surfaces;

said base being constructed in one piece from a material selected from butcher block, metal, plastic, which material is substantially bacteria and germ resistant and which has sufficient weight to prevent said base from being moved or tipped over when a plurality of ka-bobs are formed and held therein;

a pair of handles fixed to opposite side edges of said base for transporting said base and any ka-bobs held therein;

a plurality of holes formed in said base and extending entirely therethrough from said top surface to said bottom surface; and a plurality of countersinks formed on the top surface of said base; each of said countersinks surrounding and being associated with a single hole and adapted to allow a skewer to be guided into and supported by said associated hole.

2. The food preparation and holding device of claim 1, further including a plurality of skewers adapted to fit into and be supported by said plurality of holes in said base, to allow a plurality of ka-bobs to be prepared and supported in said base.

3. The food preparation and holding device of claim 2 wherein said pair of handles are fixed to said base with no clearance between the mating surfaces of said base and said handles to thereby prevent any liquids and/or solid matter from entering between said base and said handle.

4. The food preparation and holding device of claim 3, further including a clear cover mounted over said device to cover all of said holes, said clear cover being supported on said top surface of said device.

* * * * *